United States Patent

Striker et al.

[11] Patent Number: 5,929,631
[45] Date of Patent: Jul. 27, 1999

[54] METHOD OF POSITION SENSING UTILIZING GIANT MAGNETO RESISTANCE ELEMENTS AND SOLID STATE SWITCH ARRAY

[75] Inventors: David Lee Striker, Plymouth; Richard Joseph Hampo, Livonia, both of Mich.

[73] Assignee: Ford Global Technologies, Inc., Dearborn, Mich.

[21] Appl. No.: 08/887,061

[22] Filed: Jul. 2, 1997

[51] Int. Cl.[6] ............................... G01B 7/30; G01B 7/14; G01R 33/09
[52] U.S. Cl. ............................ 324/207.21; 324/207.24; 324/207.25; 324/252; 341/15
[58] Field of Search ....................... 324/207.21, 658, 324/207.11, 173, 252, 207.24, 207.25; 341/15; 340/825.07, 825.1, 825.21

[56] References Cited

U.S. PATENT DOCUMENTS

| | | | |
|---|---|---|---|
| 4,319,188 | 3/1982 | Ito et al. | 324/173 |
| 4,639,807 | 1/1987 | Sekizawa et al. | 324/207.21 X |
| 4,766,376 | 8/1988 | Takahashi et al. | 324/207.21 |
| 4,866,382 | 9/1989 | Carmen | 324/207.21 |
| 4,922,197 | 5/1990 | Juds et al. | 324/207.21 |
| 5,293,125 | 3/1994 | Griffen et al. | 324/173 |
| 5,430,375 | 7/1995 | Inoue et al. | 324/207.21 |
| 5,681,990 | 10/1997 | Hampo et al. | 324/683 |

OTHER PUBLICATIONS

Article "Giant Magnetoresistance of (001) Cr Magnetic Superlattices", Baibich et al, Physical Review Letters, Nov. 1988, pp. 2472–2475.

Primary Examiner—Gerard Strecker
Assistant Examiner—T. R. Sundaram
Attorney, Agent, or Firm—Donald A. Wilkinson

[57] ABSTRACT

A sensing method continuously scans an array of sensing elements and determines positions by converting array peak amplitude information to a time based function. An array of magneto resistive elements responds to a relatively moving magnetic field. The process of scanning the magneto resistive elements is independent of the relatively moving magnetic field. Instead of using only one voltage source to power both the driving logic circuitry and the sensing element array, a separate voltage source for powering the sensing element array is used in conjunction with the solid switch array, thus excluding unwanted noise that originates in the driving logic circuitry.

7 Claims, 7 Drawing Sheets

ROTARY POSITION

LINEAR POSITION

ROTARY POSITION

LINEAR POSITION

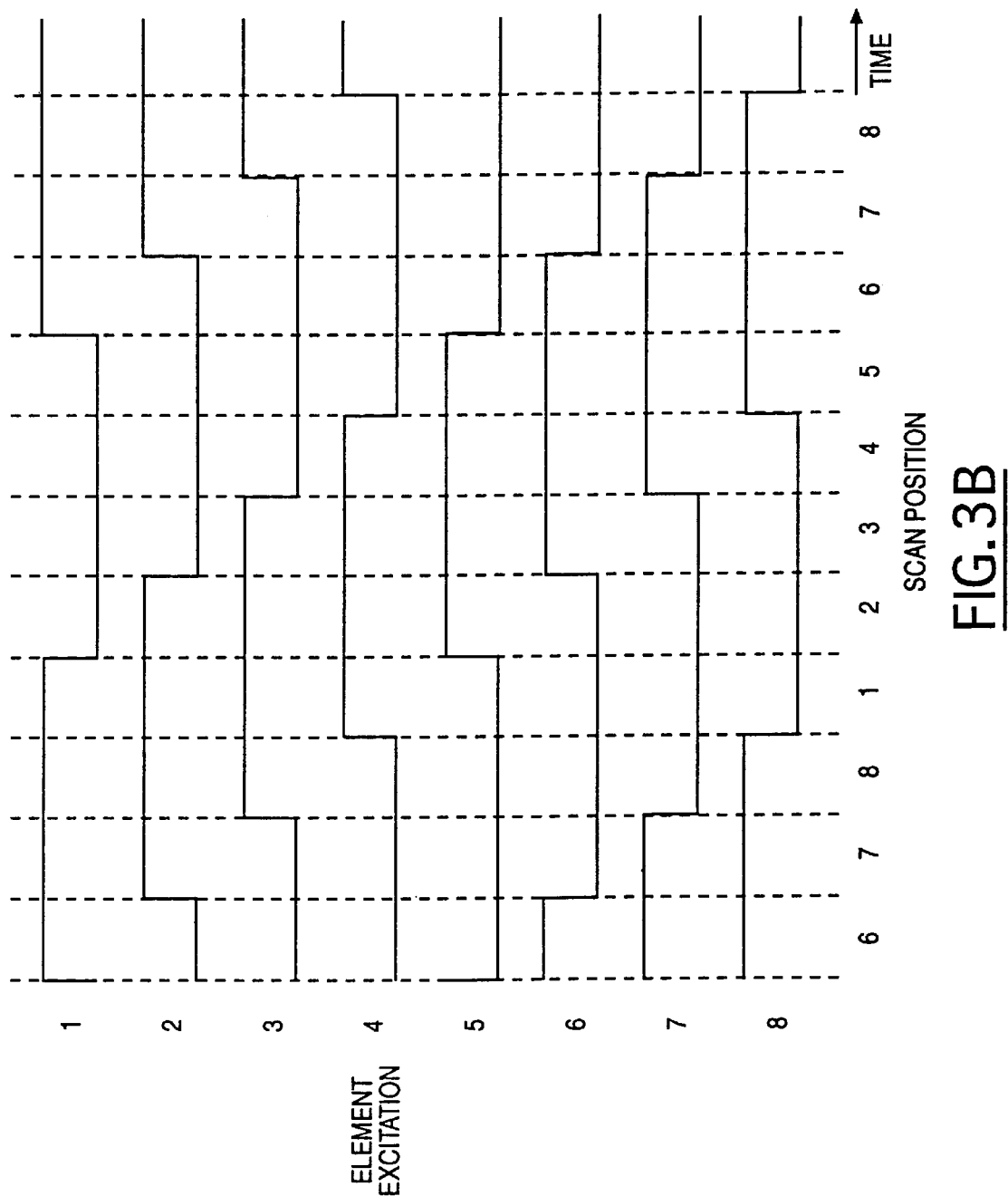

METHOD OF POSITION SENSING UTILIZING GIANT MAGNETO RESISTANCE ELEMENTS AND SOLID STATE SWITCH ARRAY

BACKGROUND OF THE INVENTION

1. Field of the Invention

This invention relates to sensing position of one element relative to another element.

2. Prior Art

Various methods for linear or rotary position sensing are known in various applications. For example, capacitive and inductive position sensors are known.

In one particular application, the movement of a throttle valve in a motor vehicle engine is responsive to the demand of the motor vehicle operator. Preferably, the air/fuel mixture is controlled in response to the throttle position, and numerous sensors for generating a control signal in response to the throttle position have been developed. However, many previously known sensors are contact sensors in which the mechanical movement of the throttle is traced by mechanical displacement of electrical conductors in order to electrically represent the change in throttle positions. Such sensors are subject to mechanical wear that can substantially affect the efficiency and longevity of the electrical conductors and other moving components. Moreover, inherent electrical noise in the output signal limits resolution to a relatively large increment of angular displacement.

An alternative form of sensors are generally referred to as noncontact sensors, but such sensors were not previously well adapted for use in throttle position sensing. For example, previously known capacitive noncontact sensors often rely on changes in the absolute capacitance between two electrodes to generate the control signal responsive to throttle position. However, the absolute value of capacitance can be affected by environmental conditions such as the variations in temperature, moisture, debris, vibration and other factors to which a moving vehicle is subjected. As a result, the accuracy of the sensor decreases as the age and use of the vehicle increases. Moreover, some previously known capacitive resolvers are limited to discrete increment segments of movement within a particular range. Other types of noncontacting sensors such as Hall effect transducers substantially increase the cost or complexity of the sensing apparatus and signal processing for necessary outputs.

It is also known to have a capacitive sensing means with a logic control for driving the sensor in a manner that relies upon relative changes rather than an absolute value of capacitance throughout operation of the sensor. In general, a driver electrode board including a plurality of electrodes is aligned adjacent a rotating member with a coupler for rotational moment with a throttle shaft. An intermediate dielectric having a spatially nonuniform conductive dimension between the driving board and the rotating member provides the relatively changing capacitance between the driver electrode board to an output electrode associated with the rotating member. The association between the electrode and the dielectric only requires that the signal path is confined to pass through the dielectric to the electrode regardless of whether the dielectric and electrode are physically united or separated at a gap. A logic driver coupled to the electrode board develops an input to the sensor body that is output from the output electrode and delivered to a signal processor for generating a phase responsive signal. A logic decoder generates a sensor output representing throttle angular position independent of absolute capacitance between the electrodes.

In particular, the logic driver generates a plurality of driving signals for driving a plurality of electrode segments. In one embodiment, eight segments are driven in incrementally sequenced portions. For example, segments 1–4 may be high while segments 5–8 are low. At the next time interval, the pattern is shifted to charge electrode segments 2, 3, 4 and 5 while 6, 7, 8 and 1 will remain low. The pattern continues, preferably at a high rate, with the rotating logic field set up between the electrode driver board and the rotating output sensing board. The signal-to-noise ratio improves with increasing frequency and its limits depend upon how high of an oscillator speed is conveniently available. The initiating driving signal or input edge is generated when any one pattern, for example, 1, 2, 3, 4 high (repeats). Each sequence of pattern repetition can be called a scan.

The driver provides digital excitation of the sensor. The output of the phase detecting circuit is digital while the angular position is preferably output by an analog signal that conforms with conventional outputs that would be generated by previously known contact sensors conventionally used. A pulse width modulated (PWM) signal, preferably fed through a low pass filter to obtain the analog signal, may be used to provide the analog signal. Alternatively, the pulse width modulated signal may be utilized as compatible with an electronic control module or other apparatus. In addition, digital output may be obtained, for example by a ten bit digital output encoder created by digital logic.

SUMMARY OF THE INVENTION

A sensing method in accordance with an embodiment of this invention continually scans an array of magneto resistive sensing elements, responsive to the relative motion of a magnetic field and determines position by converting array peak voltage amplitude information to a time based function that is more immune to environmental phenomena. The response of the magneto resistive element array to the relatively moving magnetic field is independent of the scanning process of the elements.

This sensing method is applicable to linear or rotary position sensing, and can also be adapted to spatial pressure sensing applications. The invention is advantageous in that the element array values do not depend on capacitively or inductively coupled signals driven by the scanning logic, and that the element technology can be varied to support sensor design requirements. Sensor output can be PWM, analog, or digital.

An embodiment of this method of detecting relative position includes positioning a giant magneto resistive (GMR) sensing element array with a magnetic element activation source, using a logic arrangement that scans the element array output, using an analog signal processor to prepare the scan generated information, and using a signal logic decoding system to convert the output of the analog signal processor to indicate the relative position between the activation source and the sensing element array.

BRIEF DESCRIPTION OF THE DRAWINGS

FIG. 3B is a graphical representation of excitation voltages for GMR elements versus time for the embodiment of FIG. 3A;

DETAILED DESCRIPTION OF THE INVENTION

The sensing method utilizes four basic parts: 1) a sensing element array with element activation source; 2) a logic arrangement that scans the element array outputs, 3) an analog signal processor to prepare the scan generated information, and 4) a logic decoding system to convert the analog data to a pulse width modulated (PWM) position output signal.

The array of elements uses giant magneto resistive (GMR) elements. Such resistor elements typically can have resistance which changes up to about 15% from an ambient condition to a condition in a magnetic field. The effect may be sharp in transition. If a continuous transition is desired, there are methods of breaking up each element into a plurality of components, each of which may have a relatively sharp transition, but as a group produce a continuous output.

There are also methods to increase element lengths and to overlap element ends within the magnetic field to produce a more analog output. These methods are particularly advantageous in connection with this invention when a relatively continuous sensing of position is desired.

This technique can be used for rotary or linear position sensing and the sensing array elements can be any technology capable of generating relatively equivalent signals from individual elements (magneto resistive, giant magneto resistive (GMR), Hall effect, piezoresistive, etc.) The quantity of sensor array elements can vary and accuracy is generally improved when additional elements are added. An eight element GMR array is used in this description. Information is used from adjacent elements to interpolate to determine the relative position of the rotating member responsible for moving the magnetic field.

Figure 3A:
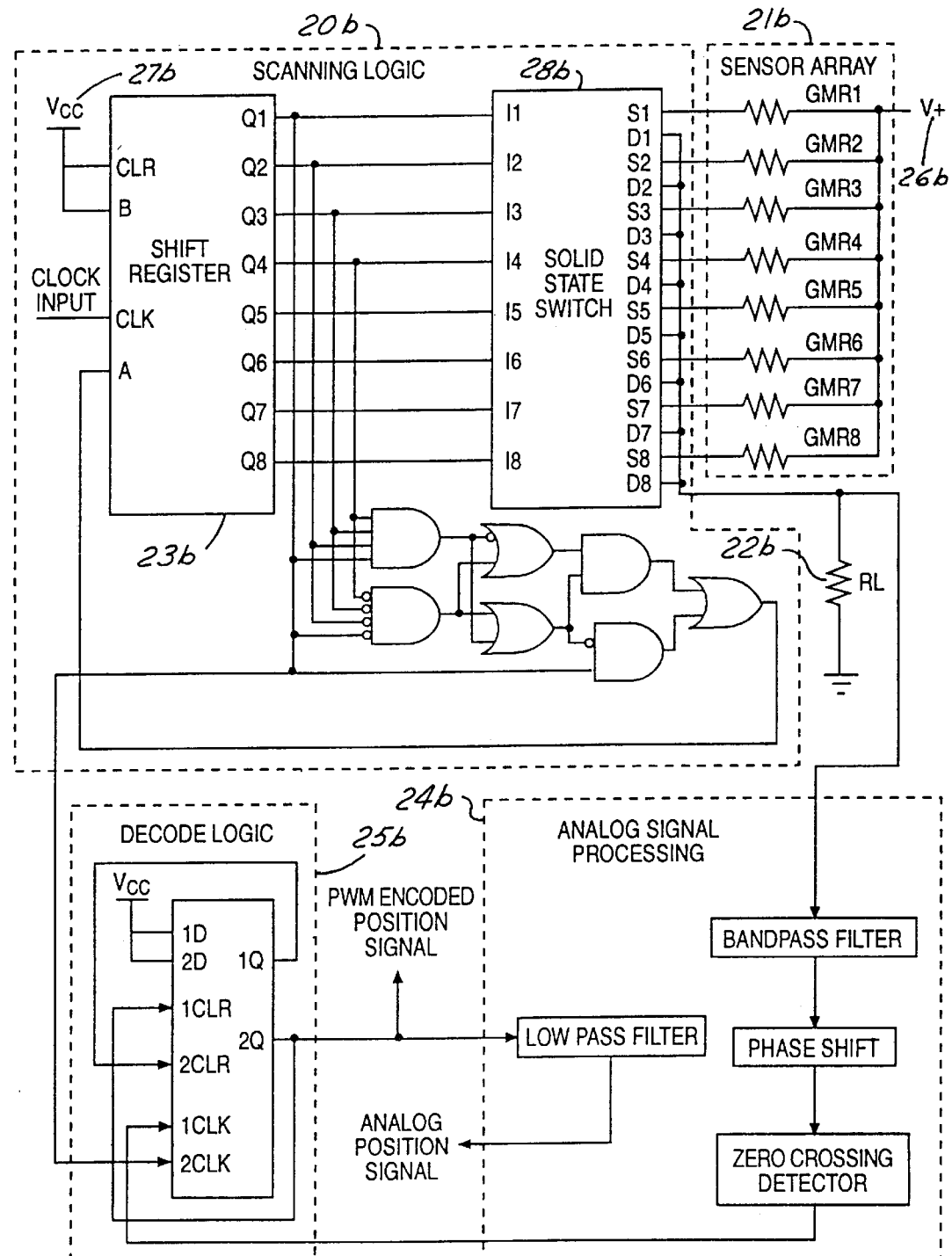
FIG. 3A is a schematic and block diagram of a sensing method and apparatus in accordance with an embodiment of this method, using a group of four resistor sensing.

An electronic switch is used to access and connect to individual elements. The speed of the electronic switching is faster than any relative physical movement of the magnetic field with respect to the elements. Various requirements for robustness of system operation may show it is advantageous to sense more than one element at a time. Thus, it is possible to have individual, sequential scanning of elements and group, sequential scanning of elements, as shown in FIG. 3A, and described in detail later in the text.

The voltage drop of the elements, or groups of elements, are compared at any given time to determine position. A fundamental phase of a waveform envelope for the individual voltage drop is an indication of relative position. That is, the information describing the relative mechanical position is encoded in the phase of the output signal of the signals representing the magneto resistive condition of the elements.

Figure 1A:
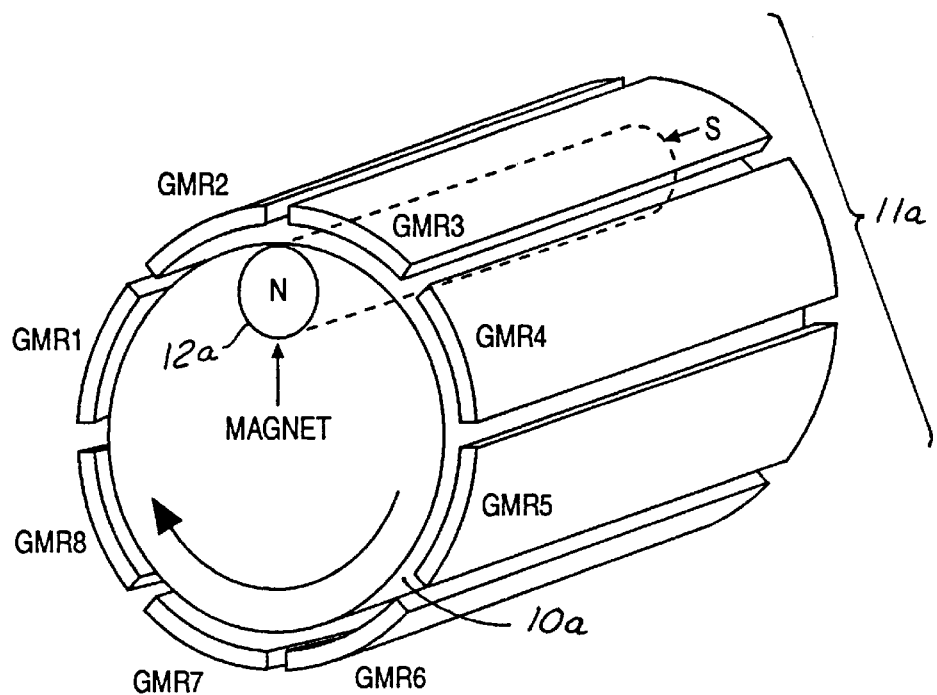
FIG. 1A is a cross section view of a rotary position sensor in accordance with an embodiment of this invention.
Figure 1B:
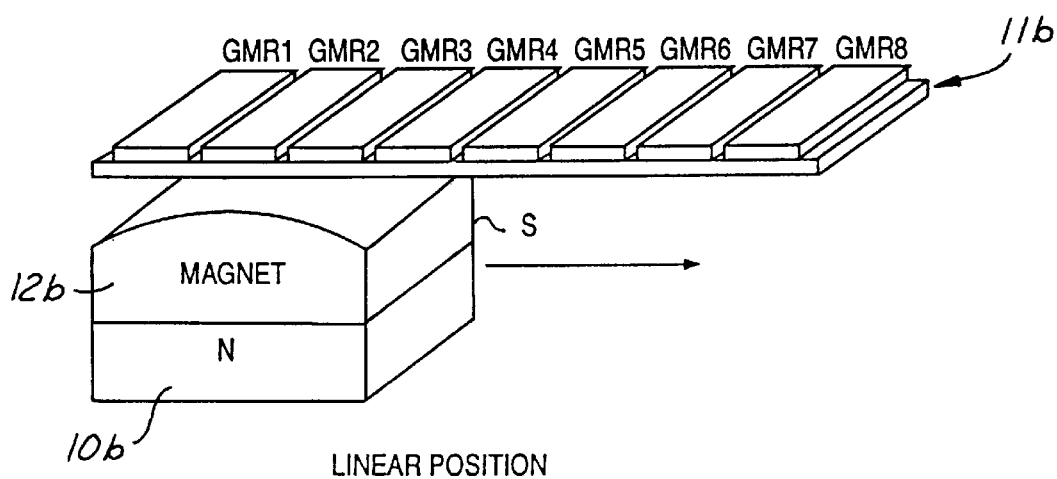
FIG. 1B is a linear position sensor in accordance with an embodiment of this invention.

For a linear movement GMR sensor (FIG. 1B), a magnet 12b is attached to a moving part 10b, and an element array 11b is aligned parallel to the path of the moving magnet. Element array 11b includes elements GMR1, GMR2, GMR3, GMR4, GMR5, GMR6, GMR7 and GMR8. For rotary movement (FIG. 1A) a magnet 12a is attached to a rotating part 10a and an element array 11a is positioned beside the path of the moving magnetic field. Element array 11a includes elements GMR1, GMR2, GMR3, GMR4, GMR5, GMR6, GMR7 and GMR8. In either case, as the magnet moves along the element array, the magnetic field is strongest across the elements in closest proximity to the magnet and these elements exhibit a greater change in resistance than the rest. In Applicants' invention, there is a voltage source Vcc 27a to provide power to a shift register 23a and a separate voltage source V+ 26a to provide power to a sensing element array 21a. A solid state switch array 28a is used to connect the elements of the sensing element array 21a to a load resistor RL 22a.

Figure 2A:
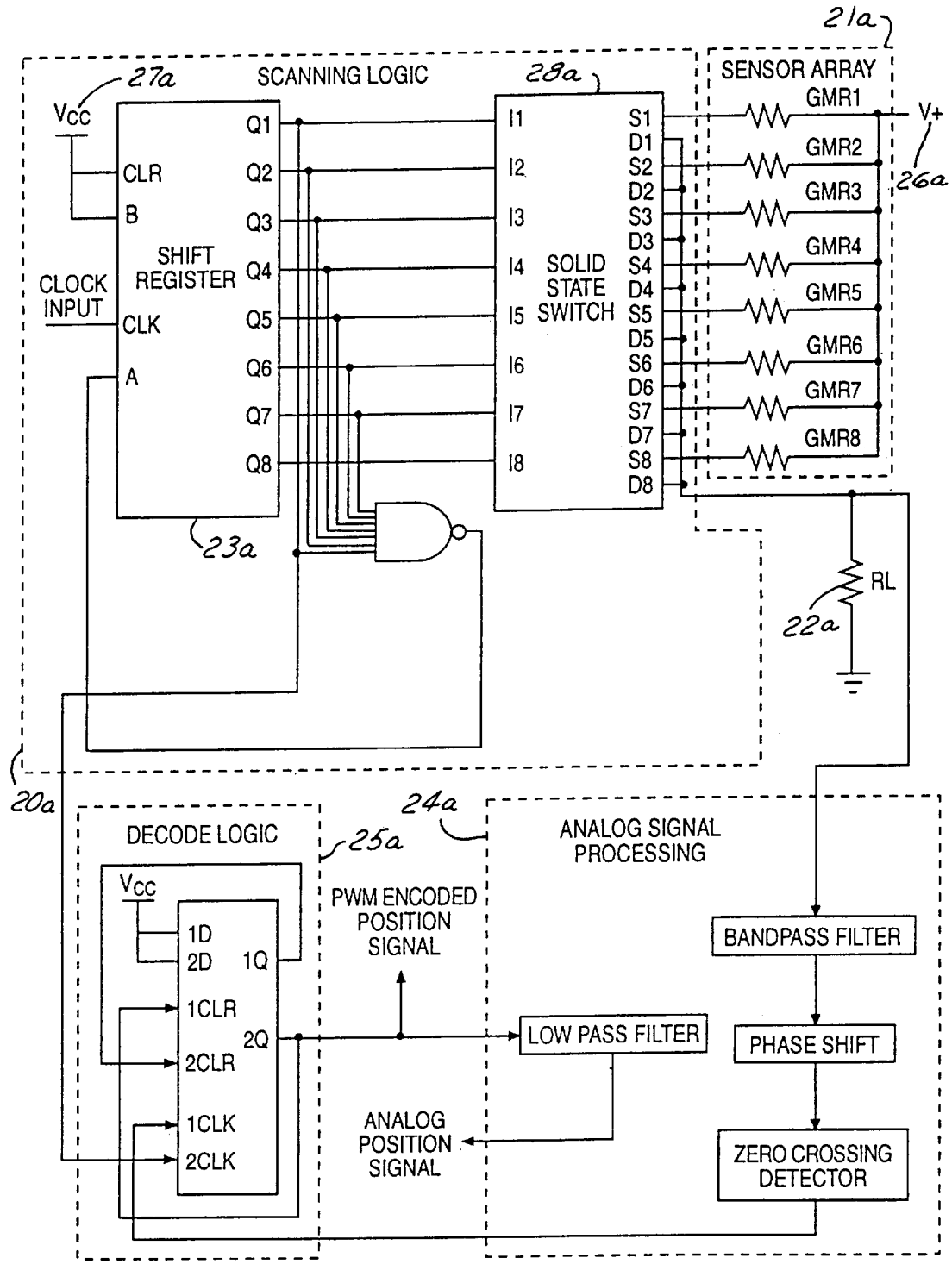
FIG. 2A is a schematic and block diagram of a sensing method and apparatus in accordance with an embodiment of this method, using individual resistor sensing.

Position is determined using the circuitry of FIG. 2A, as follows. A scanning logic portion 20a of a sensor connects the output from a set quantity (one in this description) of the sensing element array 21a to the load resistor 22a, RL, generating a voltage based on the resistance of the selected element. The scanning logic then shifts one position, connecting the next element to RL resistor 22a, etc. One sequence through all elements in the array can be called one scan. In FIG. 2A, a positive leading edge at an output Q1 of a shift resister 23a is used for scan initiation. This pattern of scanning continues indefinitely causing a changing voltage to be produced across RL resistor 22a. Load resistor 22a, RL, can be replaced by a specialized load circuit for some types of elements.

During each scan, the instantaneous voltage across RL resistor 22a will be highest when GMR elements adjacent to the magnet are selected and lowest when elements outside of the magnetic influence are selected. Minimal analog filtering optimizes the voltage signal placing the peak voltage in proper alignment with the scan period. Position information is contained in this analog voltage signal because: 1) one scan period equates to the physical length of the element array sampling range, and 2) the time from each scan initiation to peak voltage equates to the distance from the first sampled elements to the magnet position. The analog signal processing block 24a in FIG. 2A outputs a digital "zero crossing" signal the leading edge of which corresponds to the point of peak voltage on the fundamental component of the analog signal.

The scan initiation and peak voltage digital signals are processed, as in a decode logic block 25a of FIG. 2A, to produce a PWM output signal with duty cycle proportional to angle. Depending on the output format desired, the PWM signal can be used directly, it can be converted to an analog signal by low pass filtering, or the scan signal and zero crossing signal can be processed to provide a digital word output.

In summary, the scan signal is digital, the zero crossing signal circuit is digital and the position information is contained with analog resolution within their phase difference. Any number of sensor array elements greater than or equal to three can be used, but powers of two are convenient. The embodiment used here has eight elements. The scanning logic in FIG. 2A is self-starting and interrogates one element at a time. With each clock tick, the selected element shifts by one. The decode logic provides a PWM output signal having width proportional to angle. By low pass filtering this signal, an analog angular position signal can be obtained. By adding another block of digital logic, a digital output encoder can be created.

FIG. 3A shows an alternate method of sensor operation. In this case, four elements are connected in parallel at each time step of the scan in contrast to the singular element coupling shown in FIG. 2A. In FIG. 3A, the scanning logic connects four elements in parallel to load RL resistor 22b at each time step, and then shifts to the next group of four elements. For example, if elements GMR1, GMR2, GMR3, and GMR4 were connected to RL resistor 22b, then the next selection would be GMR2, GMR3, GMR4, and GMR5, followed by GMR3, GMR4, GMR5, and GMR6, etc. The output signal is thus the parallel sum of the connected elements resistance. Similar to the sensing method described in FIG. 2A, this method includes a voltage source Vcc 27b to provide power to a shift register 23b and a separate power source V+26b to provide power to a sensing element array 21b. A solid switch array 28b provides a scanning logic waveform by minimizing unwanted noise from decode logic 25b. This method allows one to utilize more elements in order to make the sensor output more robust to single element deficiencies. In this case, the elements and magnet should be designed in order to make the parallel sum of half of the elements resistance a linear function of rotor position. If one element's performance is degraded for any reason, the sensor will continue to operate, albeit a reduced accuracy.

Figure 4:
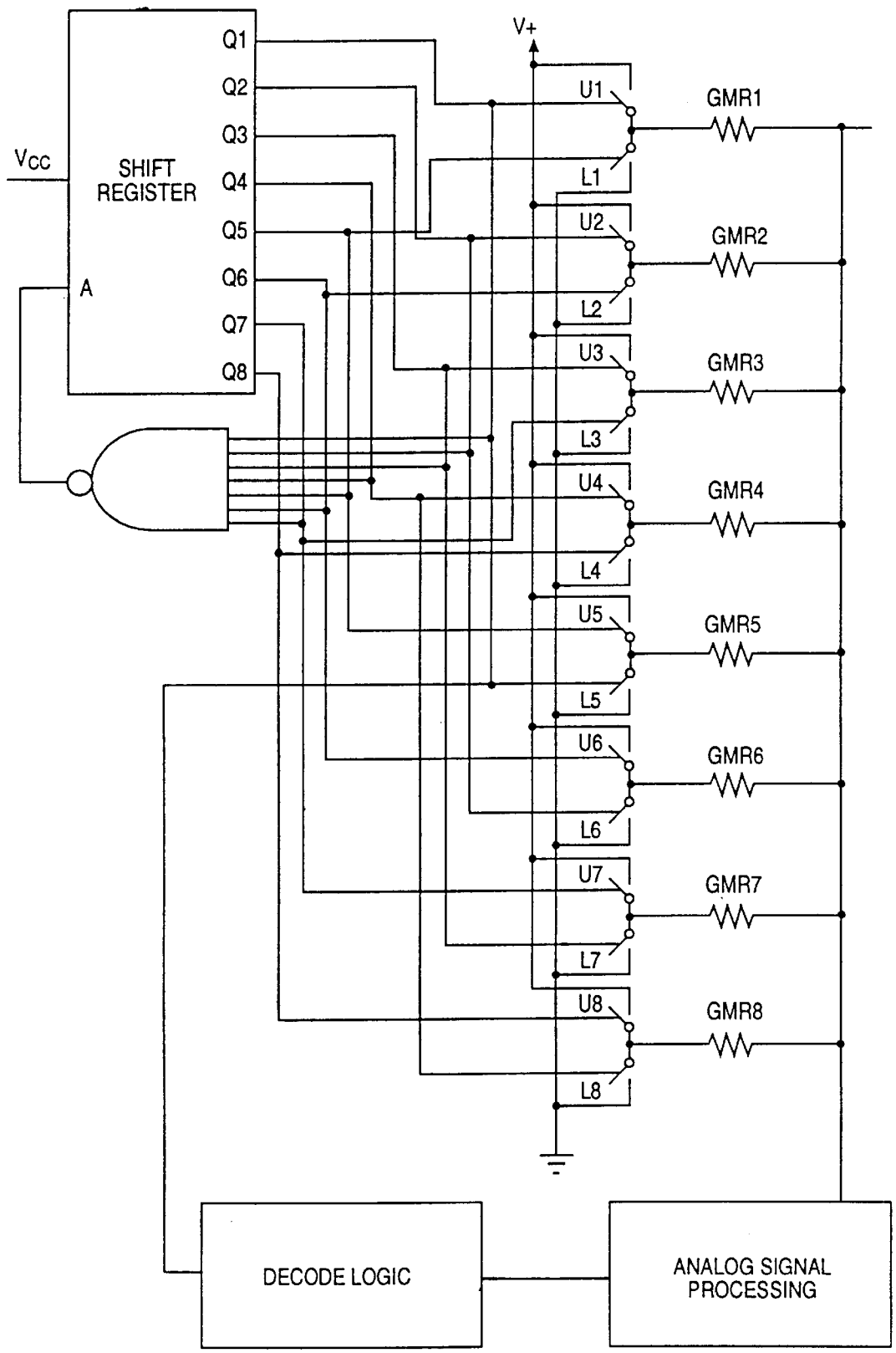
FIG. 4 is a schematic and block diagram of a sensing method and apparatus in accordance with an embodiment of this invention, using two GMR's as a voltage divider.

FIG. 4 shows an embodiment using twice as many analog switches. The switches are controlled as follows. At time period 1, switch U1 and L5 are turned on. At time period 2, switches U2 and L6 are enabled. This pattern continues such that at time 5, switches U5 and L1 are turned on. This method of excitation gives a more balanced waveform, i.e., at each time, the total resistance across which the supply voltage is applied is constant. The other two embodiments do not have this feature. The switches could be thought of as tri-state logic devices. The three allowable states are high, low, and floating.

Figure 5:
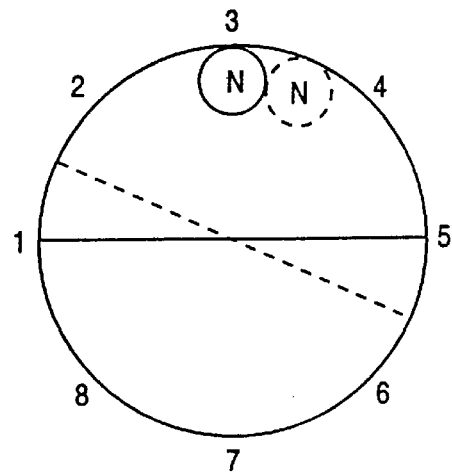
FIG. 5 is a schematic diagram of a rotating magnetic field surrounded by sensing elements.

FIG. 5 is a schematic diagram of a rotating magnetic field surrounded by sensing elements. As the north-south magnetic field moves past the sensing elements differing amounts of magneto resistance is induced in the sensing elements. This provides the fundamental means to detect relative position.

Figure 6:
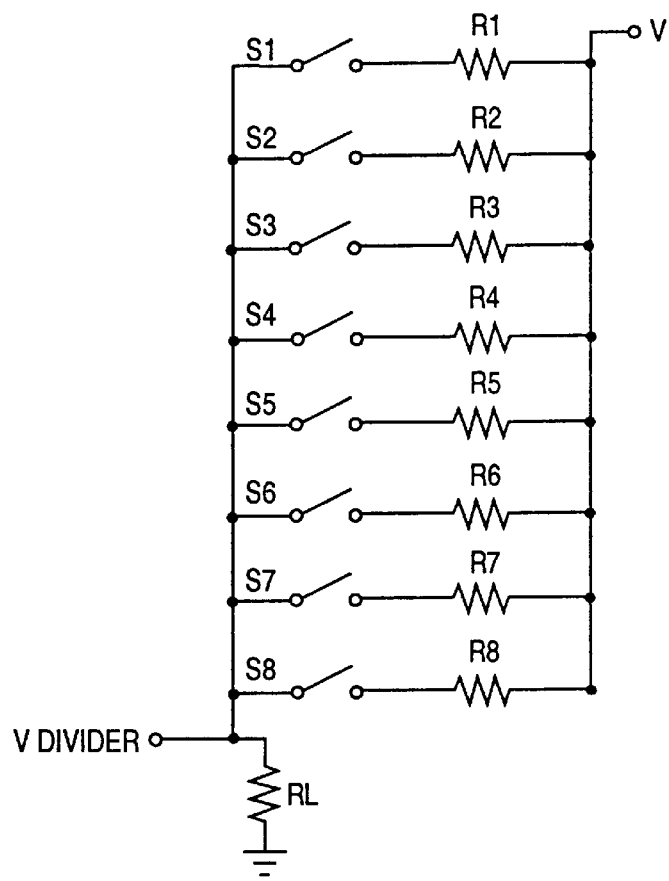
FIG. 6 is a schematic diagram of the switches selectively coupling an array element to a load resistor for determining a sensor voltage.

FIG. 6 is a schematic diagram of the switches selectively coupling an array element to a load resistor for determining a sensor voltage. The switches selectively couple a sensing element (or group of elements) between a load resistor and a voltage source. This is essentially a voltage divider, and the voltage across the load resistor indicates the resistance of the sensing element and thus its relative position to the magnetic field.

Figure 7:
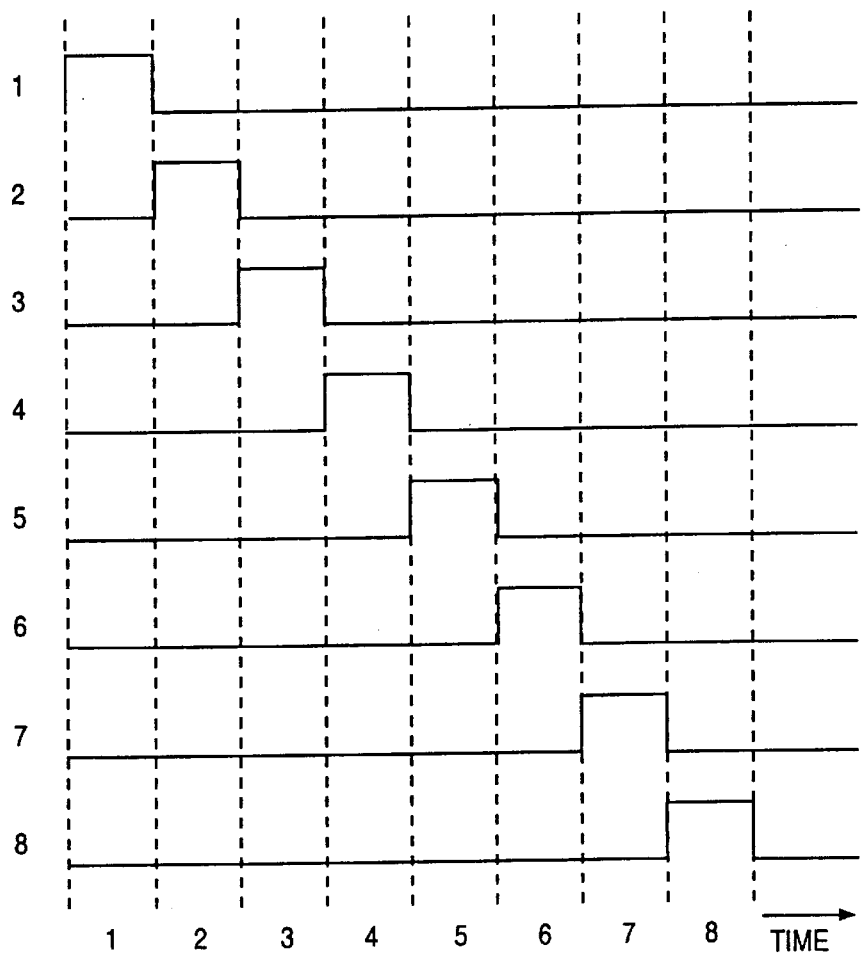
FIG. 7 is a graphical representation of voltage applied to switches for selectively coupling a load resistor to a sensing element.

FIG. 7 is a graphical representation of voltage applied to switches for selectively coupling a load resistor to a sensing element. In the embodiment shown only one sensing element is positioned in series with the load resistor at any one time. However, as previously stated, there are times when it may be desirable to couple more than one sense element to the load resistor.

Figure 8:
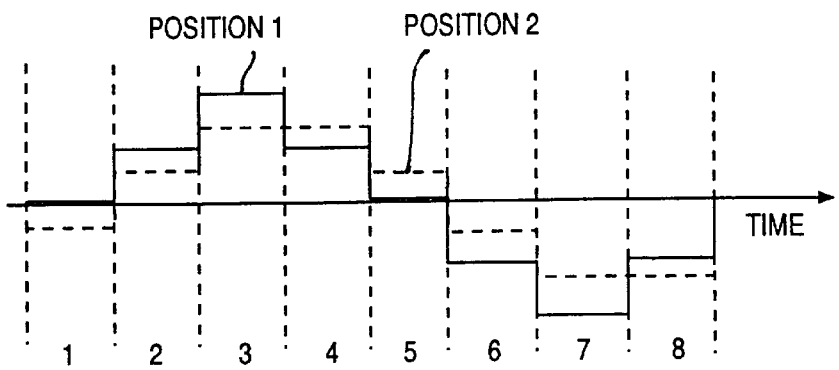
FIG. 8 is a graphical representation of the output voltage of the sensing elements for a given physical position and showing a waveform envelope for indicating position.

FIG. 8 is a graphical representation of the voltage divider output of the sensing elements for a given magnet physical position and showing a waveform envelope for indicating position. This is the waveform for one physical position, but for electronic switching scanning all of the sensing elements.

FIGS. 5–8 illustrate the operation of the sensor. In this example, at a particular instant, the rotor magnet may be positioned as shown in FIG. 5. The north pole is aligned with sensor element 3. When the excitation waveforms shown in FIG. 7 are applied to the analog switches, the waveform that is measured at RL is shown in FIG. 8. At each instant of time, the voltage across RL is the supply voltage divided by the pair of resistors comprised of one sensor element and RL. Therefore, the voltage at that time is proportional to the magnetic field sensed by the element. The dotted waveform on FIG. 8 corresponds to the case where the rotor has been turned so that the north pole of the magnet aligns halfway between sensor elements 3 and 4. This position is also depicted in FIG. 5. Note that each of the voltage steps has changed level. It follows that phase of the fundamental component of the measured signal is proportional to the position of the rotor.

This sensing arrangement is applicable to sensor arrays of various technologies provided the individual elements within the array exhibit similar characteristics. A greater number of sensing elements will generally provide improved accuracy and the sensing element array can be remote from the sensor electronics. Other logic means are also possible, including programmable logic devices and microcontrollers.

A large variety of sensing embodiments are possible using this technique depending on the resolution, accuracy, size, shape, sensor element technology and environmental requirements. This flexibility of design offers potential for reduced cost and immunity to many environmental phenomena.

Variations and modifications of the method disclosed herein will no doubt occur to those skilled in the art to which this invention pertains. Such variations and modifications which are taught by the disclosure of this invention are properly considered within the scope of the appended claims.

We claim:

1. A sensing method of detecting a relative position, including positioning a fixed giant magneto resistive (GMR) sensing element array adjacent a moving magnetic element activation source, comprising:

using a first voltage source to provide power to a shift register coupled to the GMR sensing array and a second voltage source to provide Power for the GMR sensing element array;

using a solid switch array to connect the GMR sensing element array to a load resistor;

using a logic arrangement that scans GMR sensing element array output;

using an analog signal processor to prepare scan generated information; and using a signal logic decoding system to convert the output of the analog signal processor to indicate a relative position between the activation source and the GMR sensing element array.

2. A sensing method as recited in claim 1, wherein using the logic arrangement that scans the GMR sensing element array output includes accessing individually and sequentially individual elements of the GMR sensing element array.

3. A sensing method as recited in claim 1, wherein using the logic arrangement that scans the GMR sensing element array output includes accessing groups of more than one at a time of individual elements of the GMR sensing element array and accessing such groups sequentially.

4. A sensing method as recited in claim 2, further comprising the steps of:

selectively scanning an element in the GMR sensing element array;

connecting the selectively scanned element of the GMR sensing element array to a load resistor; and generating an element voltage across the load resistor based on the combined resistance of the selectively scanned element and the load resistor.

5. A sensing method as recited in claim 4, further comprising the steps of:

compiling a plurality of such element voltages with respect to time;

determining a fundamental phase of a waveform envelope of such element voltages; and determining the relative position of the GMR sensing element array and the magnetic element activation source.

6. A sensing method as recited in claim 1, further comprising the steps of;

scanning two elements in the GMR sensing element array;

connecting the scanned elements in series; and detecting an element voltage at a point between the two elements.

7. A sensing method as recited in claim 2, further including positioning a north-south magnetic axis of the magnetic element activation source parallel to a longitudinal axis of the GMR sensing element array.

* * * * *